US007915352B2

(12) United States Patent
Rajagopalan et al.

(10) Patent No.: US 7,915,352 B2
(45) Date of Patent: Mar. 29, 2011

(54) ORGANICALLY MODIFIED SILICATE COMPOSITIONS FOR GOLF BALLS

(75) Inventors: Murali Rajagopalan, Fairhaven, MA (US); Michael J. Sullivan, Fairhaven, MA (US); Kevin M. Harris, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 338 days.

(21) Appl. No.: 12/125,854

(22) Filed: May 22, 2008

(65) Prior Publication Data

US 2009/0291777 A1 Nov. 26, 2009

(51) Int. Cl.
*A63B 37/00* (2006.01)
*A63B 37/12* (2006.01)
*C08G 18/61* (2006.01)
*C08G 77/458* (2006.01)

(52) U.S. Cl. ........ 525/457; 525/452; 525/453; 525/458; 525/476; 525/477; 525/523; 528/27; 528/28; 473/371; 473/378

(58) Field of Classification Search ........................ None
See application file for complete search history.

(56) References Cited

U.S. PATENT DOCUMENTS 4,560,168 A 12/1985 Aoyama ........................ 273/232
4,960,281 A 10/1990 Aoyama ........................ 273/232
5,334,673 A 8/1994 Wu ........................ 273/235 R
5,484,870 A 1/1996 Wu ........................ 528/28
5,688,191 A 11/1997 Cavallaro et al. ............. 473/373
5,692,974 A 12/1997 Wu et al. ........................ 473/377
5,713,801 A 2/1998 Aoyama ........................ 473/354
5,803,831 A 9/1998 Sullivan et al. ............... 473/374
5,849,168 A 12/1998 Lutz ........................ 264/755
5,885,172 A 3/1999 Hebert et al. ................. 473/354
5,908,358 A 6/1999 Wu ........................ 473/378
5,919,100 A 7/1999 Boehm et al. ................. 473/354
5,965,669 A 10/1999 Cavallaro et al. ............. 525/221
5,981,654 A 11/1999 Rajagopalan ................... 525/66
5,981,658 A 11/1999 Rajagopalan et al. .......... 525/72
6,056,842 A 5/2000 Dalton et al. ................. 156/243
6,096,823 A 8/2000 Shaffer ........................ 524/590
6,149,535 A 11/2000 Bissonnette et al. .......... 473/354
6,180,040 B1 1/2001 Ladd et al. .................... 264/248
6,180,722 B1 1/2001 Dalton et al. ................. 525/193
6,207,784 B1 3/2001 Rajagopalan ................... 528/71
6,386,992 B1 5/2002 Harris et al. .................. 473/371
6,503,156 B1 1/2003 Sullivan ........................ 473/374
6,506,130 B2 1/2003 Sullivan ........................ 437/374
6,632,147 B2 10/2003 Cavallaro et al. ............. 473/374
6,835,794 B2 12/2004 Wu et al. ........................ 528/64
6,958,379 B2 10/2005 Wu et al. ........................ 528/64
7,008,972 B2 3/2006 Sullivan et al. ................ 521/64
2001/0009310 A1 7/2001 Hebert et al.
2001/0018375 A1 8/2001 Hayashi et al.
2001/0019971 A1 9/2001 Hayashi et al.
2002/0025862 A1 2/2002 Sullivan et al.
2002/0028885 A1 3/2002 Sullivan et al.
2002/0173384 A1 * 11/2002 Hogge et al. .................. 473/378
2003/0199337 A1 10/2003 Hebert et al.
2004/0063803 A1 * 4/2004 Kim et al. ........................ 522/1

OTHER PUBLICATIONS

Whelan; Polymer Science Dictionary; 1993 p. 335.*
Hai Ni et al., Progress in Organic Coatings, 2000, vol. 38, pp. 97-110.

* cited by examiner

*Primary Examiner* — David Buttner
(74) *Attorney, Agent, or Firm* — Murphy & King, P.C.

(57) ABSTRACT

Compositions for golf balls that include organically modified silicates and the golf balls formed using the compositions are described. In particular, the compositions of the invention, which are based on a polyurethane and polysiloxane, polyurea and polysiloxane, and/or epoxy and polysiloxane, and, thus, have the benefits of increased COR, adhesion, and shear and impact resistance. The compositions of the invention may be used in any layer of a golf ball, e.g., an outer cover layer or inner cover layer, or may be used as a coating to be disposed over a structural outer layer of a golf ball.

20 Claims, 2 Drawing Sheets

ORGANICALLY MODIFIED SILICATE COMPOSITIONS FOR GOLF BALLS

FIELD OF THE INVENTION

The present invention relates to compositions for golf balls that include organically modified silicates. In particular, the compositions of the invention, which include a polymer backbone and polysiloxane, have the benefits of increased COR, adhesion, and shear and impact resistance, The compositions of the invention may be used in any layer of a golf ball, e.g., an outer cover layer or inner cover layer, or may be used as a coating to be disposed over a structural outer layer of a golf ball.

BACKGROUND OF THE INVENTION

Golf ball manufacturers have been experimenting with various materials and manufacturing methods for golf balls over the years in an attempt to improve overall performance and durability and to further refine the manufacturing process.

For example, over the past years, golf ball manufacturers have been using ionomer resins for golf ball cover materials because of the durability, rebound, and scuff resistance characteristics of the materials. However, while ionomer resins are more durable than other types of golf ball layer materials, the same properties that result in durability also provide a hard "feel" and generally result in a lower spin rate and, thus, lower control, due to the hardness of the material.

Alternatively, polyurethane compositions produce "soft" covers and typically allow for greater control because of the increased spin. Because conventional polyurethane cover materials are typically formed of aromatic components, the ultraviolet degradation of the material, which leads to yellowing, led to the recent trend toward light stable cover materials, such as aliphatic polyurethane and polyurea materials. Whether aromatic or aliphatic in nature, however, the relative softness of the polyurethane and polyurea materials introduces durability issues. In addition, when the inner cover layer of a golf ball is formed from an ionomer resin and the outer cover layer is formed from polyurethane or polyurea, adhesion between the layers is an concern. In an effort to remedy potential delamination of the layers, the inner components of most commercially available polyurethane- or polyurea-covered golf balls are surface treated, e.g., corona discharge/silane dipping, to overcome the adhesion problems. The surface treatment, however, adds cost and time to the manufacturing process.

Further attempts to compensate for the "hard" feel of ionomer-covered golf balls and durability and adhesion issues with polyurethane-covered and polyurea-covered golf balls have resulted in blends of hard ionomer resins, i.e., resins with hardness values of about 60 Shore D and above, with relatively softer polymeric materials. For example, blends of hard ionomers with polyurethanes have been used to form intermediate layers and cover layers of golf balls. However, such blends generally have processing difficulties associated with their use in the production of golf balls due to the incompatibility of the components. In addition, golf balls produced from these incompatible mixtures will have inferior golf ball properties such as poor durability, cut resistance, and the like.

There are many similar examples of materials that have beneficial qualities to golf ball manufacturers, but, because of certain detrimental qualities, cannot be used independently of other more conventional materials. For example, a material with poor moisture resistance, poor durability, or low resiliency would not be useful on its own to form a layer of a golf ball. These type of materials are generally blended with other materials or not used at all.

Likewise, ceramic materials are recognized for their hardness and stiffness, however, these properties also make it difficult, if not possible, to achieve a shear and impact resistance level acceptable for use in golf balls. Organically modified silicates, also known as ceramers, have already been used with some success in polytetrafluoroethylene (PTFE) coating systems. The inclusion of ceramers in PTFE results in higher hardness and durability. Likewise, the use of a polar ceramer with fluoropolymers may increase adhesion to metals such as copper.

Thus, a need exists in the golf ball art to find a way to use materials typically discounted for golf ball layers in a way that capitalizes on the beneficial nature of the material while at the same time minimizing or completely overcoming the detrimental qualities. For example, it would be advantageous to form a golf ball layer or coating from a composition that incorporates ceramers or the like to take advantage of the beneficial properties of the ceramer while compensating for processing issues and brittleness associated with the material. In addition, golf balls having structural and/or coating layers formed, at least in part, from such compositions would be advantageous.

SUMMARY OF THE INVENTION

The present invention is directed to a golf ball including a core and a cover, wherein at least one of the core and cover is formed from a composition including: a polymer backbone including urethane linkages, urea linkages, epoxy linkages, or a combination thereof, a polysiloxane; and a coupling agent including: an alkoxysilane including a terminal end including an isocyanate-reactive group; and an isocyanate-containing component, wherein the polymer backbone and polysiloxane are linked via the coupling agent. In one embodiment, the cover includes the composition.

In this aspect of the invention, the isocyanate-containing component may include an isocyanate, an isocyanurate, or a combination thereof. In one embodiment, the polymer backbone includes a reaction product of isocyanate and an amine-terminated component. In another embodiment, the isocyanate-reactive group includes an amino group, a hydroxy group, or a combination thereof. In still another embodiment, the polysiloxane includes tetraethylorthosilicate.

The present invention also relates to a golf ball including: a core; an intermediate layer; and a cover, wherein at least one of the intermediate layer and cover are formed from a composition including: a polymer backbone including polyurethane, polyurea, an oxirane functional resin, or a combination thereof; a polysiloxane; and a coupling agent including: an isocyanate-containing component having a plurality of terminal ends including isocyanate groups; an alkoxysilane including a functional group capable of reacting with the isocyanate groups, wherein the polymer backbone is linked to at least one of the plurality of terminal ends including isocyanate groups in the coupling agent, and wherein the polysiloxane is linked to the alkoxysilane in the coupling agent.

In one embodiment, the intermediate layer is formed from the composition. In another embodiment, the cover is formed from the composition.

In this aspect of the invention, the coupling agent may include amino-functional alkoxysilane. In one embodiment, the isocyanate-containing component includes an isocyanurate. In another embodiment, the polymer backbone includes the reaction product of an isocyanurate and an amine-terminated component. In still another embodiment, the functional group on the alkoxysilane includes an amino group or a hydroxy group.

The present invention also relates to a golf ball including a core and a cover, wherein the cover includes a composition including: a polymer backbone including the reaction product of an isocyanate and an amine-terminated component; a polysiloxane; and a coupling agent including a plurality of terminal ends including isocyanate groups and at least one alkoxysilane terminal group, wherein the isocyanate polymer backbone is linked to at least one of the plurality of terminal ends including isocyanate groups in the coupling agent, and wherein the polysiloxane is linked to the alkoxysilane in the coupling agent.

In this aspect of the invention, the golf ball may include an intermediate layer disposed between the core and the cover. In one embodiment, the intermediate layer includes an ionomer resin. In an alternate embodiment, the intermediate layer includes a non-ionomeric material.

The polysiloxane may include tetraethylorthosilicate. In one embodiment, the polymer backbone consists essentially of urea linkages. In another embodiment, the coupling agent includes the reaction product of isocyanurate and an amine-terminated alkoxysilane component.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
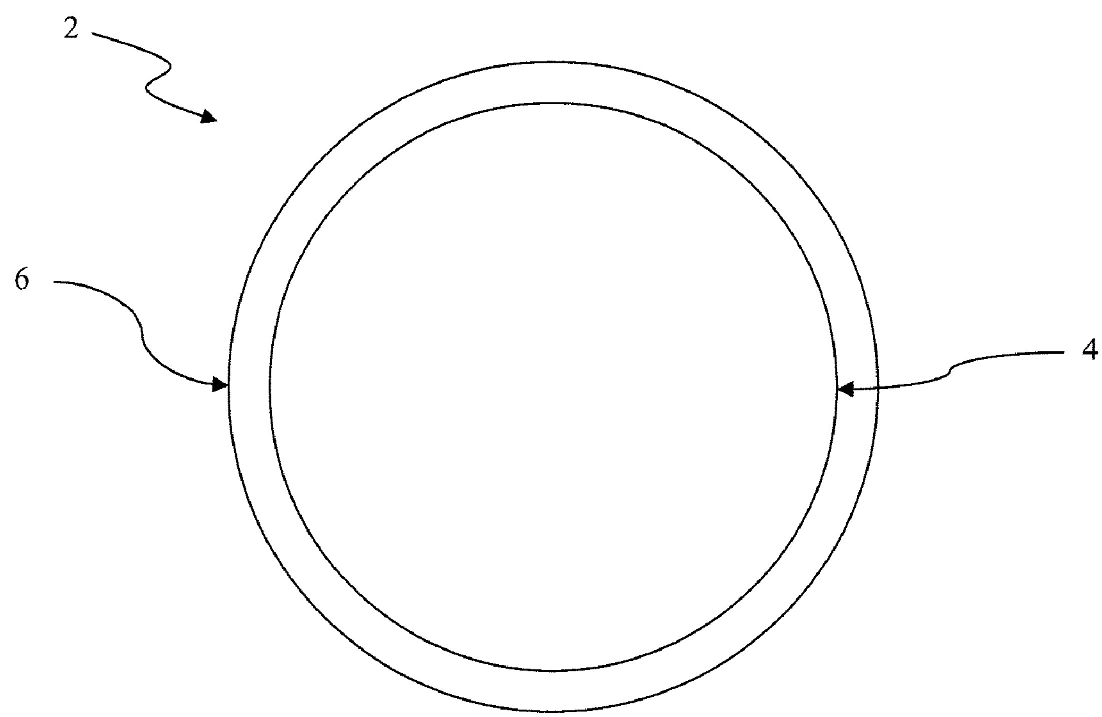
FIG. 1 is a cross-sectional view of a two-piece golf ball, wherein the cover is formed from a composition of the invention.

The present invention relates to compositions for use in golf balls including at least one organically modified silicate. In particular, the compositions of the invention include a backbone based on polyurethane, polyurea, and/or epoxy that is linked to a polysiloxane with a coupling agent.

The backbone provides flexibility and, thus, increases the shear resistance of the composition and the polysiloxane increases the hardness and stiffness of the composition. In fact, as known to those of ordinary skill in the art, the bond strength of the Si—O siloxane bond is about 108 kcal/mole. Comparatively, the bond strength of the C—C carbon bond of organic polymers is about 83 kcal/mole. As such, the use of polysiloxane with a relatively soft backbone, such as a polyurethane, polyurea, or epoxy resin, is believed to improve the durability and heat resistance of the resultant composition. In addition, without being bound to any particular theory, the addition of the polysiloxane is believed to improve light stability based on the fact that siloxane bonds are virtually unaffected by sunlight and ultraviolet attack. As such, the heat, ultraviolet light, and chemical resistance properties of the siloxane improve the properties of the polymer backbone.

However, since the backbone is organic in nature and the polysiloxane is generally inorganic in nature, a coupling agent is necessary to bring the two phases together. The coupling agent used in the present invention includes a functionalized isocyanate- or isocyanurate-containing component that couples the organic and inorganic phases via a urea/urethane/epoxy linkage and a siloxane linkage.

The compositions of the invention provide an alternative to materials that have processing, delamination, and stiffness issues when used in layers of golf balls and coatings for golf balls. In addition, the present invention explores the methods of making such compositions and the golf balls that are formed using the compositions in structural layers and/or coating layers.

The compositions of the invention can be used with a variety of golf ball constructions. For example, the compositions of the invention may be used as a cover layer in a two-piece ball with a large core, an outer cover layer in a three-piece ball with a relatively thin inner cover layer, an intermediate layer in a three-piece ball, or an inner cover layer in a golf ball having dual cover layers. In addition, the compositions of the invention may be used to form coatings for golf balls. The composition components, golf ball constructions, and layer and ball properties are discussed in greater detail below.

The Compositions of the Invention

The compositions of the invention include organically modified silicates for use in golf components. In particular, the compositions of the invention include at least one organically modified silicate having a backbone including polyurethane, polyurea, and/or an oxirane functional resin. The polymer backbone provides the general mechanical properties and adds flexibility to the composition while the silicate improves hardness and stiffness and, in some cases, adhesion. The components of the composition are discussed below.

Polymer Backbone

The polymer backbone of the compositions of the invention may be based on a polyurethane, a polyurea, an epoxy, or a combination thereof. For example, the backbone may be formed from a polyurethane prepolymer, which is the reaction product of an isocyanate component and a hydroxy-terminated component, a polyurea prepolymer, which is the reaction product of an isocyanate component and a amine-terminated component, or an oxirane functional resin, each of which are discussed in more detail below.

Polyurethane-Based Polymer Backbone

When based on polyurethane, the backbone of the compositions of the invention may be formed with a polyurethane prepolymer, where the prepolymer is a product formed by a reaction between at least one isocyanate and at least one polyol. The components of the polyurethane prepolymer may be aromatic, aromatic-aliphatic, or aliphatic, which provide varying degrees of light stability. As used herein, aromatic aliphatic compounds should be understood as those containing an aromatic ring, wherein the isocyanate group is not directly bonded to the ring.

Along a continuum, an aromatic composition is less light stable than an aromatic-aliphatic composition, which is less light stable than an aliphatic composition. For example, an aliphatic composition made according to the invention includes only saturated components, i.e., components substantially free of unsaturated carbon-carbon bonds or aromatic groups, which prevents yellowing over time. The term "saturated," as used herein, refers to compositions having saturated aliphatic and alicyclic polymer backbones, i.e., with no carbon-carbon double bonds. It is important to note, however, that aromatic compositions made according to the invention may include light stabilizers to improve light stability. Thus, light stability may be accomplished in a variety of ways for the purposes of this application.

Isocyanates for use with the polyurethane prepolymer include aliphatic, cycloaliphatic, aromatic aliphatic, aromatic, derivatives thereof, and combinations of these compounds having two or more isocyanate (NCO) groups per molecule. As briefly mentioned above, however, the isocyanate may be saturated to improve the light stability of the composition of the invention. The isocyanates may be organic polyisocyanate-terminated precursors, low free isocyanate precursors, and mixtures thereof. The isocyanate component may also include any isocyanate-functional monomer, dimer, trimer, or multimeric adduct thereof, precursor, quasi-precursor, or mixtures thereof. Isocyanate-functional compounds may include monoisocyanates or polyisocyanates that include any isocyanate functionality of two or more.

Suitable isocyanate-containing components include diisocyanates having the generic structure: O═C═N—R—N═C═O, where R is preferably a cyclic or linear or branched hydrocarbon moiety containing from about 1 to 20 carbon atoms. The diisocyanate may also contain one or more cyclic groups. When multiple cyclic groups are present, linear and/or branched hydrocarbons containing from about 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or a mixture thereof.

Examples of saturated (aliphatic) diisocyanates that can be used in the polyurethane precursor include, but are not limited to, ethylene diisocyanate; propylene-1,2-diisocyanate; tetramethylene diisocyanate; tetramethylene-1,4-diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In one embodiment, the saturated diisocyanates include isophoronediisocyanate (IPDI), 4,4'-dicyclohexylmethane diisocyanate ($H_{12}$MDI), 1,6-hexamethylene diisocyanate (HDI), or a combination thereof.

As briefly discussed, aromatic aliphatic isocyanates may also be used to form the polyurethane precursor. While use of aromatic aliphatic materials does not confer the same amount of light stability to the resultant product compared to those including purely aliphatic materials, it does provide a greater degree of light stability to the resultant product compared to those formed with purely aromatic materials. Examples of aromatic aliphatic isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof. In addition, the aromatic aliphatic isocyanates may be mixed with any of the saturated isocyanates listed above for the purposes of this invention.

Unsaturated diisocyanates, i.e., aromatic compounds, may also be used with the present invention, although the use of unsaturated compounds in the precursor is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI (PMDI, a brown liquid composed of approximately 50% methylene diisocyanate with the remainder comprised of oligomers of MDI), carbodimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4"-triisocyanate, napthylene-1,5-diisocyanate, 2,4'-, 4,4'-, and 2,2'-biphenyl diisocyanate, polyphenylene polymethylene polyisocyanate (PMDI) (also known as polymeric PMDI), and mixtures thereof.

An isocyanate group reacts with the hydroxyl groups of the hydroxy-terminated component to form a repeating urethane linkage, which has the following general structure:

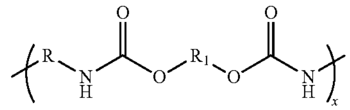

where x is the chain length, i.e., about 1 or greater, and R and $R_1$ are straight chain or branched hydrocarbon chain having about 1 to about 20 carbons.

The hydroxy-terminated component suitable for the present invention may be organic, modified organic, saturated, aliphatic, alicyclic, unsaturated, araliphatic, aromatic, substituted, or unsubstituted in nature. The hydroxy-terminated component preferably has two or more reactive hydrogen groups per molecule, such as primary or secondary hydroxyl groups or amine groups, and at least one cyclic, aromatic, aliphatic, linear, branched, or substituted hydrocarbon moiety containing from 1 to about 20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. Any and all of the hydroxy-terminated components disclosed herein may be used alone or in combination of two or more thereof.

Suitable hydroxy-terminated oligomers or polymers have molecular weights of at least about 200 and at least two primary or secondary hydroxyl terminal groups per molecule, and include, but are not limited to hydroxy-terminated polyethers, hydroxy-terminated polyesters, hydroxy-terminated polycaprolactones, hydroxy-terminated polycarbonates, hydroxy-terminated polyhydrocarbons, hydroxy-terminated acid functional oligomers or polymers (or ionomers thereof derived from partial or full neutralization with organic or inorganic cations), and the like. As used herein, the term "about" is used in connection with one or more numbers or numerical ranges, and should be understood to refer to all such numbers, including all numbers in a range.

Suitable hydroxy-terminated polyethers include, but are not limited to polytetramethylene ether glycol ("PTMEG"); low-molecular-weight PTMEG; modified PTMEG; hydroxy-terminated copolymer of polytetrahydrofuran and polymethyltetrahydrofuran ("PTG-L"); poly(oxyethylene)glycol; poly (oxypropylene)glycol; (ethylene oxide)-capped poly (oxypropylene) ether glycol; poly(oxyethylene-co-oxypropylene) glycol; and mixtures thereof.

Suitable hydroxy-terminated polyesters include, but are not limited to, poly(ethylene adipate) glycol; poly(butylene adipate) glycol; poly(hexamethylene adipate) glycol; poly (ethylene propylene adipate) glycol; poly(ethylene butylene adipate) glycol; poly(hexamethylene butylene adipate) glycol; (o-phthalate-1,6-hexanediol)-based polyester polyol; poly(ethylene terephthalate)-based polyester polyol, and mixtures thereof.

Suitable hydroxy-terminated polycaprolactones include, but are not limited to, (alkylene oxide)-initiated polycaprolactones; (ethylene glycol)-initiated polycaprolactone; (diethylene glycol)-initiated polycaprolactone; (propylene glycol)-initiated polycaprolactone; (dipropylene glycol)-initiated polycaprolactone; 1,4-butanediol-initiated polycaprolactone; trimethylolpropane-initiated polycaprolactone; (neopentyl glycol)-initiated polycaprolactone; 1,6-hexanediol-initiated polycaprolactone; PTMEG-initiated polycaprolactone; 2-ethyl-2-(hydroxymethyl)-1,3-propanediol initiated polycaprolactone; and mixtures thereof.

Examples of suitable hydroxy-terminated polycarbonates include, but are not limited to poly(phthalate carbonate) glycol; poly(hexamethylene carbonate) glycol; poly(1,4-cyclohexanedimethylene carbonate) glycol; (bisphenol A)-based polycarbonate glycols; and mixtures thereof.

Non limiting examples of hydroxy-terminated polyhydrocarbons include polyisoprene polyol (a.k.a. liquid isoprene rubber); poly(hydrogenated isoprene) polyol; polybutadiene polyol; poly(hydrogenated butadiene) polyol; and mixtures thereof.

Hydroxy-terminated acid functional oligomers or polymers that may used with the present invention include, but are not limited to, dimerate or trimerate polyols of fatty acids or isostearic acid; acid functional polyols as disclosed in U.S. Pat. No. 6,207,784; and mixtures thereof.

Other hydroxy-terminated polymers may be used with the present invention, such as hydroxy-terminated polyolefins; hydroxy-terminated polyamides; glycerol-based polyols; (castor oil)-based polyols; hydroxy-terminated alkylene-styrene copolymers (a.k.a. Kraton® polyols); and hydroxy-terminated acrylic polyols.

Saturated members of the above-listed hydroxy-terminated oligomers or polymers are preferred for use in the present invention, because these components afford superior light stability when incorporated into the golf ball compositions of the invention. Saturated hydroxy-terminated polymers may be aliphatic, alicyclic, or fully hydrogenated. Exemplary saturated hydroxy-terminated polymers include, but are not limited to, PTMEG; low-molecular-weight PTMEG; modified PTMEG; PTG-L; poly(oxyethylene)glycol; poly(oxypropylene)glycol; (ethylene oxide)-capped poly(oxypropylene) ether glycol; poly(ethylene adipate) glycol; poly(butylene adipate) glycol; poly(hexamethylene adipate) glycol; poly(ethylene propylene adipate) glycol; poly (ethylene butylene adipate) glycol; poly(hexamethylene butylene adipate) glycol; (alkylene oxide)-initiated polycaprolactones; (ethylene glycol)-initiated polycaprolactone; (diethylene glycol)-initiated polycaprolactone; (propylene glycol)-initiated polycaprolactone; (dipropylene glycol)-initiated polycaprolactone; 1,4-butanediol-initiated polycaprolactone; trimethylolpropane-initiated polycaprolactone; (neopentyl glycol)-initiated polycaprolactone; 1,6-hexanediol-initiated polycaprolactone; PTMEG-initiated polycaprolactone; poly(hexamethylene carbonate) glycol; saturated poly(hydrogenated isoprene) polyol; saturated poly (hydrogenated butadiene) polyol; saturated dimerate or trimerate polyols of fatty acids or isostearic acid; saturated hydroxy-terminated polyolefins; saturated hydroxy-terminated polyamides; saturated glycerol-based polyols; saturated (castor oil)-based polyols; and saturated hydroxy-terminated alkylene-styrene copolymers.

In one embodiment, the hydroxy-terminated component has a hydrophobic backbone. By using hydroxy-terminated components based on a hydrophobic backbone, the polyurethane compositions of the invention may be more water resistant than those polyurethane compositions without a hydrophobic backbone. Some non-limiting examples of hydroxy-terminated based on a hydrophobic backbone include hydrocarbon polyols, hydroxy-terminated polybutadiene polyols, polyethers, polycaprolactones, and polyesters.

The hydroxy-terminated component may also be blended with additional amine-terminated components, as discussed below with respect to the polyurea prepolymers. Once an amine-terminated component is included in the polyurethane prepolymer, however, the excess isocyanate in the mixture reacts with the amine groups in the amine-terminated component and forms urea linkages, which results in a prepolymer that includes both urethane and urea linkages. Such a prepolymer is distinct from a polyurethane prepolymer including only an isocyanate and a hydroxy-terminated component or a polyurea prepolymer including only an isocyanate and an amine-terminated component. For the sake of clarity, this type of segment will be referred to as a polyurethane-polyurea prepolymer throughout the application.

As known to those of ordinary skill in the art, the polyurethane prepolymer contains some amount of free isocyanate monomer. Thus, in one embodiment, the polyurethane prepolymer is stripped of free isocyanate monomer. For example, after stripping, the precursor may contain about 1 percent or less free isocyanate monomer. In another embodiment, the precursor contains about 0.5 percent by weight or less of free isocyanate monomer.

Polyurea-Based Polymer Backbone

The polymer backbone may also be based on a polyurea prepolymer, where the prepolymer is a product formed by a reaction between at least one diisocyanate and at least one amine-terminated component. The polyurea prepolymers may be saturated or unsaturated. In one embodiment, the polyurea prepolymers are saturated and, thus, the prepolymer is the product of a reaction between at least one saturated diisocyanate and at least one saturated amine-terminated component.

For the purposes of the present invention, the polyurea prepolymers include primarily urea linkages having the following general structure:

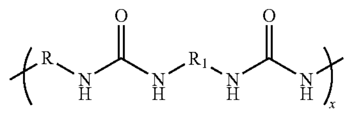

where x is the chain length, i.e., about 1 or greater, and R and $R_1$ are each independently straight chains or branched hydrocarbon chains having about 1 to about 20 carbons.

It should be understood that polyurea prepolymers for use with the present invention typically provide a comparable or greater degree of softness to the resulting polymer backbone than a polymer backbone based on urethane linkages. In fact, the main difference between the polyurethane prepolymer discussed above and the polyurea prepolymer discussed in this section is the substitution of the hydroxy-terminated component with an amine-terminated component. Therefore, the isocyanates suitable for inclusion in the polyurea prepolymers are the same as those listed above with respect to the polyurethane prepolymers, which are incorporated by reference here. And, as above, while saturated isocyanates are preferred, aromatic aliphatic isocyanates and aromatic isocyanates are contemplated for use with the present invention.

It should also be understood, however, that a prepolymer including primarily urea linkages may have distinctly different properties than a prepolymer including primarily urethane linkages due to the substitution of the hydroxy-terminated component with the amine-terminated component. For example, when a polyurea prepolymer is used to form the backbone, the resulting composition may have different shear, cut, resiliency, and adhesion properties than a composition with a backbone formed from a polyurethane prepolymer.

Any amine-terminated compound available to one of ordinary skill in the art is suitable for use in the polyurea precursor. For example, the amine-terminated compound may include amine-terminated hydrocarbons, amine-terminated polyethers, amine-terminated polyesters, amine-terminated polycarbonates, amine-terminated polycaprolactones, and mixtures thereof. The amine-terminated segments may be in the form of a primary amine ($NH_2$), a secondary amine (NHR), or mixtures thereof. U.S. Pat. No. 6,958,379, which is incorporated by reference herein, discloses suitable amine-terminated compounds for use with the present invention.

The molecular weight of the amine-terminated compound for use in the invention may range from about 100 to about 10,000. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. Because lower molecular weight amine-terminated components may be prone to forming solid polyureas, a higher molecular weight oligomer may be used to avoid solid formation.

In one embodiment, the amine-terminated compound includes amine-terminated hydrocarbons having the following generic structures:

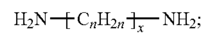

$H_2N-[C_nH_{2n}]_x-NH_2$;

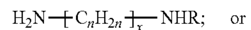

$H_2N-[C_nH_{2n}]_x-NHR$; or

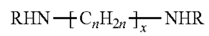

$RHN-[C_nH_{2n}]_x-NHR$ where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof.

The amine-terminated compound may also include amine-terminated polyethers having following generic structures:

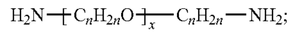

$H_2N-[C_nH_{2n}O]_x-C_nH_{2n}-NH_2$;

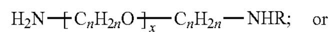

$H_2N-[C_nH_{2n}O]_x-C_nH_{2n}-NHR$; or

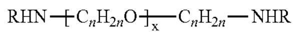

$RHN-[C_nH_{2n}O]_x-C_nH_{2n}-NHR$ where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof. Suitable polyether amines include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the precursor is Jeffamine® D2000 (manufactured by Huntsman Corporation of Austin, Tex.).

In addition, the amine-terminated compound may include amine-terminated polyesters having the generic structures:

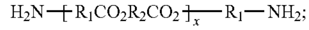

$H_2N-[R_1CO_2R_2CO_2]_x-R_1-NH_2$;

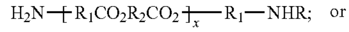

$H_2N-[R_1CO_2R_2CO_2]_x-R_1-NHR$; or

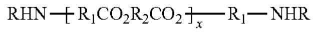

$RHN-[R_1CO_2R_2CO_2]_x-R_1-NHR$ where x is the chain length, i.e., 1 or greater, preferably about 1 to about 20, R is any alkyl group having from about 1 to about 20 carbon atoms, preferably about 1 to about 12 carbon atoms, a phenyl group, a cyclic group, or mixture thereof, and $R_1$ and $R_2$ are straight or branched hydrocarbon chains, e.g., alkyl or aryl chains.

Copolymers of polycaprolactone and polyamines may also be used to form the polyurea segments of the present invention. These copolymers include, but are not limited to, bis(2-aminoethyl)ether initiated polycaprolactone, 2-(2-aminoethylamino) ethanol, 2-2(aminoethylamino) ethanol, polyoxyethylene diamine initiated polycaprolactone, propylene diamine initiated polycaprolactone, polyoxypropylene diamine initiated polycaprolactone, 1,4-butanediamine initiated polycaprolactone, trimethylolpropane-based triamine initiated polycaprolactone, neopentyl diamine initiated polycaprolactone, hexanediamine initiated polycaprolactone, polytetramethylene ether diamine initiated polycaprolactone, and mixtures thereof. In addition, polycaprolactone polyamines having the following structures may be useful in forming the polyurea prepolymers of the present invention:

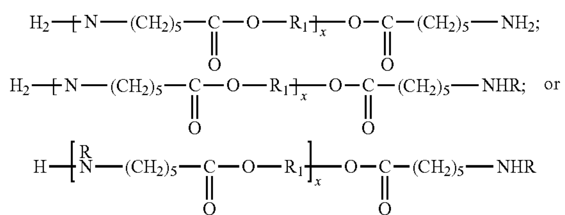

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

In addition, the following may be used as the amine-terminated component of the present invention:

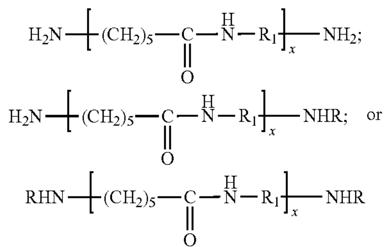

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

In another embodiment, the amine-terminated compound may be an amine-terminated polycarbonate having one of the following generic structures:

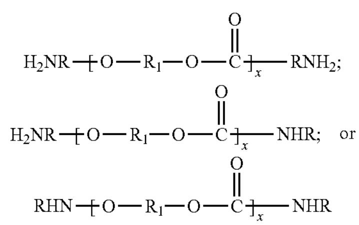

where x is the chain length, which preferably ranges from about 1 to about 20, R is one of an alkyl group having from about 1 to about 20 carbons, preferably about 1 to about 12 carbons, a phenyl group, or a cyclic group, and $R_1$ is a straight chain hydrocarbon or predominantly bisphenol A units or derivatives thereof.

Amine-terminated polyamides may also be reacted with the isocyanate component to form the polyurea segment of the present invention. Suitable amine-terminated polyamides include, but are not limited to, those having following structures:

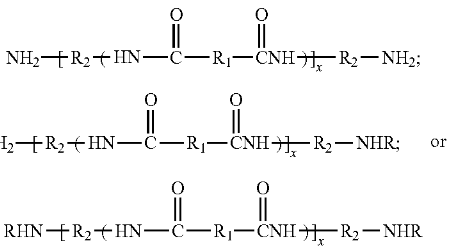

where x is the chain length, i.e., about 1 or greater, R is one of an alkyl group having from about 1 to about 20 carbons, preferably about 1 to about 12 carbons, a phenyl group, or a cyclic group, $R_1$ is an alkyl group having about 1 to about 12 carbon atoms, a phenyl group, or a cyclic group, and $R_2$ is an alkyl group having about 1 to about 12 carbon atoms (straight or branched), a phenyl group, or a cyclic group.

Additional amine-terminated compounds that may also be useful in forming the polyurea segments of the present invention include, but are not limited to, poly(acrylonitrile-co-butadiene); poly(1,4-butanediol) bis(4-aminobenzoate) in liquid or waxy solid form; linear and branched polyethylenimine; low and high molecular weight polyethylenimine having an average molecular weight of about 500 to about 30,000; poly(propylene glycol) bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

Thus, in one embodiment, the polyurea segment includes a poly(acrylonitrile-co-butadiene) having one of the following structures:

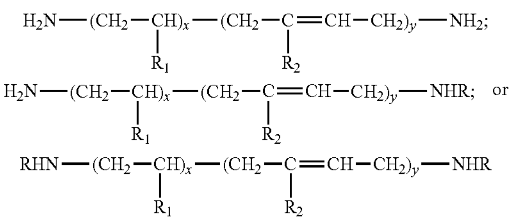

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, $R_1$ is a hydrogen, methyl group, cyano group, phenyl group, or a mixture thereof, and $R_2$ is a hydrogen, a methyl group, chloride, or a mixture thereof. In one embodiment, the y:x ratio is about 82:18 to about 90:10. In other words, the poly(acrylonitrile-co-butadiene) may have from about 10 percent to about 18 percent acrylonitrile by weight.

In another embodiment, the polyurea segment includes a poly(1,4-butanediol) bis(4-aminobenzoate) having one of the following structures:

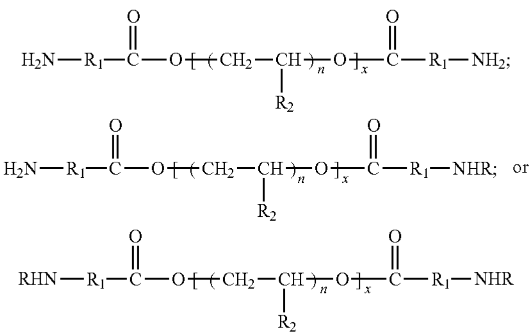

where x and n are chain lengths, i.e., 1 or greater, and n is preferably about 1 to about 12, R and $R_1$ are linear or branched hydrocarbon chains, an alkyl group having from about 1 to about 20 carbons, preferably about 1 to about 12 carbons, a phenyl group, a cyclic group, or mixtures thereof, and $R_2$ is a hydrogen, a methyl group, or a mixture thereof. In one embodiment, $R_1$ is phenyl, $R_2$ is hydrogen, and n is about 2.

In yet another embodiment, the polyurea segment includes at least one linear or branched polyethyleneimine having one of the following structures:

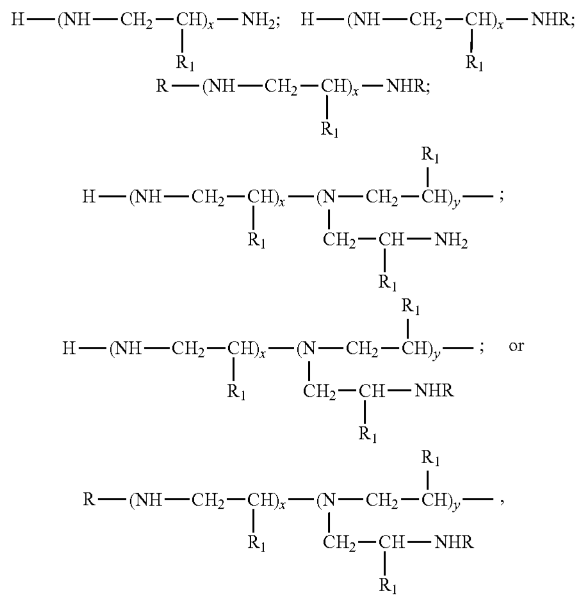

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, and $R_1$ is a hydrogen, methyl group, or a mixture thereof. In one embodiment, $R_1$ is hydrogen. In another embodiment, the polyurea composition includes a mixture of linear and branched polyethyleneimines.

In still another embodiment, the polyurea segment of the present invention includes a polytetrahydrofuran bis(3-aminopropyl) terminated compound having one of the following structures:

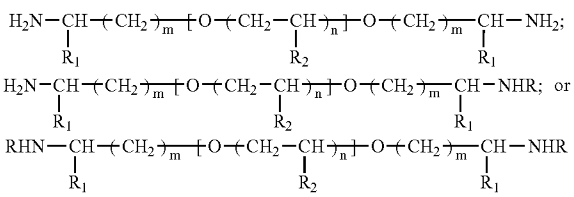

where m and n are chain lengths, i.e., 1 or greater, n is preferably about 1 to about 12 and m is preferably about 1 to about 6, R is any one alkyl group having from about 1 to about 20 carbons, preferably about 1 to about 12 carbons, a phenyl group, a cyclic group, or mixtures thereof, and $R_1$ and $R_2$ are hydrogen, methyl groups, or mixtures thereof. In one embodiment, both $R_1$ and $R_2$ are hydrogen and both m and n are about 2.

By using amine-terminated components based on a hydrophobic segment, the polyurea precursors may provide more water resistance than those polyurea segments formed with an amine-terminated hydrophilic segment. Thus, in one embodiment, the amine-terminated component includes hydrophobic backbone, e.g., an unsaturated or saturated hydrocarbon-based amine-terminated component. One example of an amine-terminated hydrocarbon is an amine-terminated polybutadiene.

The amine-terminated component may also be blended with additional hydroxy-terminated components, as discussed above with respect to the polyurethane prepolymers. Once a hydroxy-terminated component is included in the polyurea prepolymer, however, the excess isocyanate in the mixture reacts with the hydroxyl groups in the hydroxy-terminated component and forms urethane linkages, which results in a prepolymer that includes both urea and urethane linkages. Such a prepolymer is distinct from a polyurea prepolymer including only an isocyanate and an amine-terminated compound or a polyurethane prepolymer including only an isocyanate and a hydroxy-terminated component. For the sake of clarity, this type of segment will be referred to as a polyurea-polyurethane prepolymer throughout the application.

Oxirane Functional Resin as the Polymer Backbone

The polymer backbone may also be based on an oxirane functional resin. Suitable oxirane functional resins include resins having at least two functional groups, i.e., a first functional group containing an oxirane moiety and a second functional group capable of reacting with the NCO groups on the silane-functionalized component. The oxirane functionality may be obtained from any suitable compound containing the following structure:

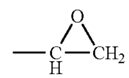

which is commonly referred to as an "epoxy" functionality or epoxide group. The second functional group may include hydroxy groups, amine groups, or a combination thereof. In one embodiment, the oxirane functional resin has two or more epoxide groups, which may be terminal epoxide groups or internal epoxide groups.

Examples of suitable oxirane functional resins according to the present invention include, but are not limited to, cycloaliphatic, aliphatic, and aromatic glycidyl epoxides, such as glycidyl ethers and glycidyl esters, cycloaliphatic epoxides, aliphatic epoxides, and mixtures thereof.

Suitable glycidyl esters for use with the present invention include those having the following general structure:

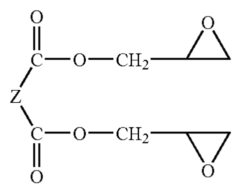

and glycidyl ethers having the following general structure:

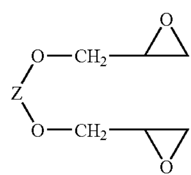

where Z is phenyl, alkyl-substituted phenyl, bisphenol A, cyclohexane, cyclohexene, alkyl substituted derivatives thereof, and the like.

Suitable cycloaliphatic epoxides include, but are not limited to, those having the following general structure:

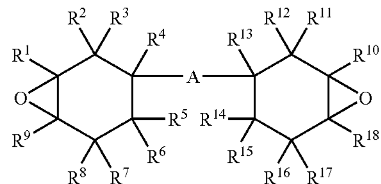

where $R^1$ to $R^{18}$ each independently may be H or an alkyl group, and A may be O or

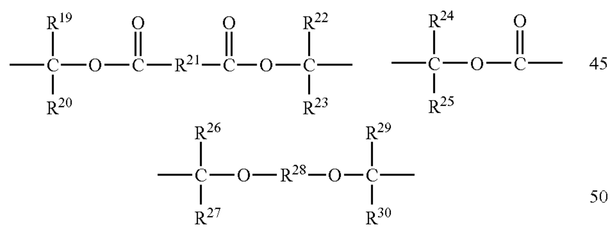

where $R_{19}$-$R^{10}$, $R^{22}$-$R^{27}$, and $R^{29}$-$R^{30}$ are each independently H or an alkyl group and $R^{21}$ and $R^{28}$ are alkylene functional groups. In an alternate embodiment, A and $R^{13}$ may be combined to form:

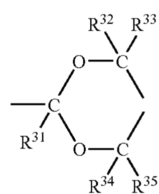

where $R^{31}$ to $R^{35}$ are each independently H or an alkyl group. In this aspect of the invention the alkyl groups are preferably $C_1$-$C_8$ alkyl groups and the alkylene groups are preferably $C_1$-$C_{12}$ branched or straight chain alkylene groups.

Examples of suitable cycloaliphatic epoxides include bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate, 3,4-epoxycyclohexylmethyl-3,4-epoxycyclohexane carboxylate, 3,4-epoxy-1-methylcyclohexylmethyl-3,4-epoxycyclohexane carboxylate, 3,4-epoxy-1-methylcyclohexylmethyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, and 2-(3,4-epoxycyclohexyl-5,5-spiro-3,4-epoxy)cyclohexane-meta-dioxane.

Other suitable cycloaliphatic epoxides include

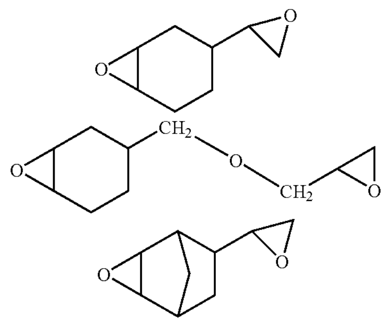

and alkyl substituted derivatives thereof, as well as fused ring cycloaliphatic epoxides, such as:

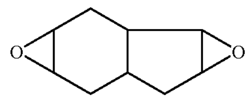

and alkyl substituted derivatives thereof.

In one embodiment, the oxirane functionality is obtained through the use of reaction products of phenols or carboxylic acids and epichlorohydrin, reaction products of an aliphatic polyol and epichlorohydrin, oxidized polyolefins, or combinations thereof. Examples of aliphatic polyols include any of the saturated polyols discussed above with respect to the polyurethane prepolymer. In one embodiment, the aliphatic polyol is glycerol. The oxidized polyolefins may be oxidized using any suitable acid, e.g., peracetic acid. In another embodiment, the epoxy resin is a modified epoxy resin including halogenated bisphenol. A commercially available bisphenol A epoxy resin is EPON®, a Jeffamine resin manufactured by Huntsman Corporation of Austin, Tex.

Epoxidized esters of unsaturated alcohols and unsaturated carboxylic acids are contemplated for use as the oxirane functional resin. In one embodiment, the oxirane functional resin includes at least one of glycidyl glycidate; 2,3-epoxybutyl-3,4-epoxypentanoate; 3,4-epoxy-3,4-epoxyhexyl; 3,4-epoxypentanoate; or mixtures thereof. In another embodiment, the oxirane functional resin includes epoxidized esters of unsaturated monohydric alcohols and polycarboxylic acids, such as diglycidyl adipate; diglycidyl isophthalate; di(2,3-epoxybutyl)adipate; di(2,3-epoxybutyl)oxalate; di(2,3-epoxyhexyl)succinate; di(3,4-epoxybutyl)maleate; di(2,3-epoxyoctyl)pimelate; di(2,3-epoxybutyl)phthalate; di(2,3-epoxyoctyl)tetrahydrophthalate; di(4,5-epoxydodecyl) maleate; di(2,3-epoxybutyl)teraphthalate; di(2,3-epoxypentyl)thiodipropionate; di(5,6-epoxytetradecyl) diphenyldicarboxylate; di(3,4-epoxyheptyl)sulfonyldibutyrate; di(5,6-epoxypentadecyl)maleate; di(2,3-epoxybutyl)azelate; di(3,4-epoxybutyl)citrate; di(5,6-epoxyoctyl)cyclohexane-1,3-dicarboxylate; di(4,5-epoxyoctadecyl)malonate; tri(2,3-epoxybutyl)-1,2,4-butanetricarboxylate; and mixtures thereof.

Other examples of oxirane functional resins suitable for use with the present invention include, but are not limited to, epoxidized derivatives of polyethylenically unsaturated polycarboxylic acids; epoxidized polyesters that are the reaction product of an unsaturated polyhydric alcohol and/or an unsaturated polycarboxylic acid or anhydride groups; epoxidized polyethylenically unsaturated hydrocarbons; glycidyl ethers of novolac resins; and mixtures thereof.

Those of ordinary skill in the art are aware of the methods of forming suitable oxirane-functional compounds for use with the present invention. For example, the diglycidyl ether of bisphenol A, i.e., 2,2-bis[4-(2',3'-epoxypropoxy)phenyl] propane, is formed by reacting bisphenol A and epichlorohydrin. Glycidyl ester resins, such as glycidyl methacrylate ester copolymers, are typically prepared by reacting an epichlorohydrin with a carboxylic acid.

Polysiloxane

The "inorganic" portion of the composition of the invention may be based on a polysiloxane. In particular, a polysiloxane (also referred to as a polymerized siloxane or silicone) have organic side chains (R≠H) and are typically viewed as a hybrid of both organic and inorganic compounds. The organic side chains confer hydrophobicity, whereas the —Si—O—Si—O— backbone is inorganic.

Polysiloxanes for use with the present invention include any polymeric structure that contains repeating silicon-oxygen groups in the backbone, side chains, or crosslinks, regardless of the substitution on the silicon atom. In one embodiment, the polysiloxane for use with the present invention includes a polymeric oxysilane where each silicon atom is bonded with up to four alkoxide or hydroxyl groups. In another embodiment, the polysiloxane has four alkoxide or hydroxyl groups bonded to each silicon atom.

In one embodiment, the polysiloxanes contain repeating units of the formula:

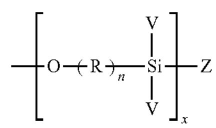

where R is a hydrocarbon radical or oxy substituted hydrocarbon radical, each V, which can be the same or different, is hydrogen, a hydrocarbon radical or a hydrolyzable group; Z is a hydrolyzable group, n is an integer having a value of about 1 to about 18, and x is an integer having a value of at least about 2, preferably from about 2 to about 1000, and more preferably from about 5 to about 25. For example, R may be $C_1$-$C_{18}$ alkylenes, such as methylene, ethylene, propylene, butylene, hexylene and the like or $C_1$-$C_{18}$ alkoxy groups, such as methyloxymethyl, methyloxypropyl, ethyloxyethyl, ethyloxypropyl, propyloxypropyl, propyloxybutyl, propyloxyhexyl and the like. V may be $C_1$-$C_{18}$ alkyl groups, such as methyl, ethyl, n-propyl, isopropyl, n-butyl, n-hexyl and the like; $C_1$-$C_{18}$ alkoxy groups, such as methoxy, ethoxy, propoxy, hexoxy, dodecyloxy, methoxyethoxy and the like; $C_6$-$C_8$ aryl groups, such as phenyl, methyl phenyl, ethyl phenyl and the like; $C_5$-$C_8$ cycloaliphatic groups, such as cyclopentyl, cyclohexyl, cyclohexyloxy and the like. The hydrolyzable groups used for Z may be the same alkoxy groups as described for V; oxy aryl groups, such as oxyphenyl and the like; oxyaliphatic groups, such as oxyhexyl and the like; halogens, such as chlorine and the like.

For example, polysiloxanes for use with the present invention may have the following general structure:

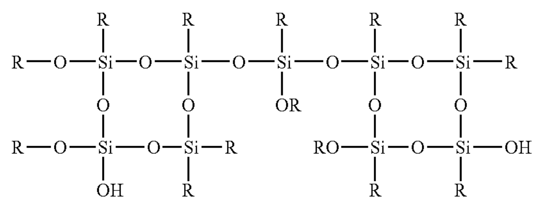

where each R may be H, alkyl, aryl, phenyl, Si, or combinations thereof.

Suitable examples of polysiloxanes include, but are not limited to, dimethylsiloxane ($[SiO(CH_3)_2]_n$), diphenylsiloxane ($[SiO(C_6H_5)_2]_n$), cyclic and linear oligomers of tetraethylorthosilicate (($Si(OC_2H_5)_4$) (TEOS)), polymerized acetooxyethyltrimethoxy silane, polymerized acetooxyethyltriethoxy silane, polymerized acetooxyethyltriethoxy-tris-(2-methoxyethoxy)silane, polymerized β-methacryloxyethyltrimethoxy silane, polymerized γ-methacryloxyethyltrimethoxy silane, polymerized acetooxyethylmethyldimethoxy silane, polymerized γ-methacryloxypropyltrimethoxy silane, polymerized acetooxypropyltrimethoxy silane, acetooxypropyltriethoxy silane, polymerized γ-methacryloxypropyl-tris-(2-methoxyethoxy) silane and mixtures thereof. For example, in one embodiment, the polysiloxane has the general formula $Si(OR)_4$, where R is an alkyl group, such as methyl, ethyl, propyl, butyl, and the like, a cyclic group, a phenyl group, or mixtures thereof.

Those of ordinary skill in the art are aware of the methods to make polysiloxanes including step-growth polymerization (a type of polycondensation) and ring-opening copolymerization.

Coupling Agent

The coupling agent used in the present invention includes a functionalized isocyanate- or isocyanurate-containing component. In particular, coupling agent functionalized component may be the reaction product of an isocyanurate or isocyanate and an alkoxysilane. The isocyanurate or isocyanate may be aliphatic (saturated), cycloaliphatic, aromatic aliphatic (semi-saturated), or aromatic (unsaturated). The term "saturated" as used herein, refers to compositions having saturated aliphatic and alicyclic polymer backbones, i.e., with no carbon-carbon double bonds. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

Any of the isocyanates discussed above for use in forming a polyurethane or polyurea prepolymer are suitable for use in forming the coupling agent. Nonlimiting examples of isocyanurates suitable for use in forming the silane-functionalized component include trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof.

The alkoxysilane may include any alkoxysilane having two functional groups: the first capable of reacting with the NCO groups of the isocyanate or isocyanurate and the second capable of reacting with the polysiloxane during curing. For example, the alkoxysilane has the general formula $XR_1$—Si—$(OR_2)_n$ where OR is an alkoxy group at one terminal end that is capable of reacting with the polysiloxane during curing and $XR_1$ is a functional group capable of reacting with NCO to form the coupling agent. In one embodiment, OR is one of methoxy, ethoxy, propoxy, trimethoxy, triethoxy, tripropoxy, or mixtures thereof.

The $XR_1$, terminal end, i.e., the functional group capable of reacting with the NCO groups of the isocyanate or isocyanurate may include an amino group, a hydroxy group, an epoxy group, or mixtures thereof. For example, in one embodiment, X represents an amino group and $R_1$ is an alkyl group, cycloalkyl group, aryl group, phenyl group, or a mixture thereof. Examples include, but are not limited to, N-phenylaminopropyl-trimethoxysilane, N-cyclohexylaminopropyl-triethoxy-silane, N-methylaminopropyl-trimethoxysilane and the corresponding alkyl diethoxy and alkyl dimethoxy silanes, bis-(γ-trimethoxysilylpropyl)amine, and mixtures thereof.

In another embodiment, X represents a hydroxy group and $R_1$ is an alkyl group, cycloalkyl group, aryl group, or a mixture thereof. In still another embodiment, X represents a epoxy group and $R_1$ is an alkyl group, cycloalkyl group, aryl group, or a mixture thereof.

Those of ordinary skill in the art would be aware of suitable methods for forming the coupling agent as discussed above. For example, U.S. Pat. No. 6,096,823, incorporated in its entirety by reference herein, provides a method for forming a suitable coupling agent. In particular, the isocyanate or isocyanurate may be reacted with an amino-functional silanes in an amount sufficient such that the moisture-curable compounds contain isocyanate groups and alkoxy groups, which are bound to Si, in an equivalent ratio of about 1.0:0.05 to about 1.0:2.5, preferably about 1.0:0.05 to about 1.0:2.2 and more preferably about 1.0:0.1 to about 1.0:2.0. The reaction is preferably carried out by incrementally adding the isocyanate-reactive compound to the isocyanate.

Making the Organically Modified Silicate

The resulting composition may be formed in a variety of ways. For example, the coupling agent may be formed first and then reacted with the polymer backbone and polysiloxane simultaneously or sequentially. The coupling mechanism is that the isocyanate group in the functionalized isocyanate-containing component connects the polyurea, polyurethane, and/or oxirane functional resin polymer backbone and the alkoxysilane group links the polysiloxane during the moisture curing.

In one embodiment, the coupling agent includes a terminal amino group and a terminal alkoxy group, the polymer backbone includes polyurea linkages, and the polysiloxane includes tetraethylorthosilicate. In another embodiment, the coupling agent includes a terminal hydroxy group and a terminal alkoxy group, the polymer backbone includes polyurethane linkages, and the polysiloxane includes tetraethylorthosilicate. In yet another embodiment, the coupling agent includes a terminal amino or hydroxyl group and a terminal alkoxy group, the polymer backbone includes epoxy groups, and the polysiloxane includes tetraethylorthosilicate.

Variations of these components are also contemplated to result in compositions including a combination for urea and urethane linkages, urea and epoxy linkages, and urethane and epoxy linkages. For example, the coupling agent may include a terminal amino group that reacts with the NCO groups to create urea linkages and the polymer backbone may be based on urethane linkages.

The compositions of the invention may be moisture cured with water to result in a polyurethane/polysiloxane crosslinked product, a polyurea/polysiloxane crosslinked product, an epoxy/polysiloxane crosslinked product, and mixtures thereof. In addition, curatives, such as amine-terminated components, hydroxy-terminated components, and the like may be used to cure any excess NCO groups. As such, the curing process may be performed solely with water or with water and an additional curing agent.

Blends

The compositions of the present invention may also be blended with other polymers. In particular, the compositions of the invention preferably include about 1 percent to about 100 percent of the organically modified silicate. In one embodiment, the compositions contain about 10 percent to about 90 percent of the organically modified silicate, preferably from about 10 percent to about 75 percent of the organically modified silicate, and about 90 percent to 10 percent, more preferably from about 90 percent to about 25 percent of the second polymer component and/or other materials as described below. For example, a blend in accordance in the present invention may have about 10 percent to about 40 percent of the organically modified silicate and about 60 percent to about 90 percent of another thermoplastic polymer, e.g., a conventional ionomer. In an alternate embodiment, a blend in accordance with the invention may include about 40 percent to about 80 percent of the organically modified silicate and about 20 percent to about 60 percent of another thermoplastic polymer. Unless otherwise stated herein, all percentages are given in percent by weight of the total composition of the golf ball layer in question.

For example, the compositions of the invention may be present in a blend with ionomeric copolymers or terpolymers, ionomeric precursors, thermoplastics, polyamides, polycarbonates, polyesters, polyurethanes, polyureas, thermoplastic elastomers, polybutadiene rubber, balata, grafted and non-grafted metallocene-catalyzed polymers, single-site polymers, high-crystalline acid polymers, cationic polymers, cationic and anionic urethane ionomers and urethane epoxies, polyurethane ionomers, polyurea ionomers, epoxy resins, polyethylenes, polyacrylin, siloxanes, and mixtures thereof.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention that are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

One of ordinary skill in the art would be well aware of methods to blend these polymeric materials with the organically modified silicate of the invention to form a composition for use in golf ball layers.

Additives

The compositions of the invention may include a variety of additives. For example, the compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Fillers may also be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

When the compositions of the invention are used in the core layers of the golf ball, fillers may also be used to modify the weight of the core to create a specialty ball, e.g., a lower weight ball is preferred for a player having a low swing speed.

Additional materials conventionally included in other golf ball compositions may also be included in the compositions of the invention. For example, antioxidants, stabilizers, softening agents, plasticizers, including internal and external plasticizers, reinforcing materials, and compatibilizers may also be added to any composition of the invention. Those of ordinary skill in the art are aware of the purpose of these additives and the amounts that should be employed to fulfill those purposes.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multilayer cover depending on the type of performance desired of the ball. That is, the compositions of the invention may be used in a core, an intermediate layer, and/or a cover of a golf ball, each of which may have a single layer or multiple layers.

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

When the golf ball of the present invention includes an intermediate layer, which may also include more than one layer, this layer may be incorporated with a single or multilayer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

Referring to FIG. 1, a golf ball 2 of the present invention can include a center 4 and a cover 6 surrounding the center 4. While dimensions and materials are discussed in more detail below, a golf ball of the invention can include a large core, e.g., about 1.55 inches to about 1.60 inches, and a relatively soft, thin cover formed from the composition of the invention.

Figure 2:
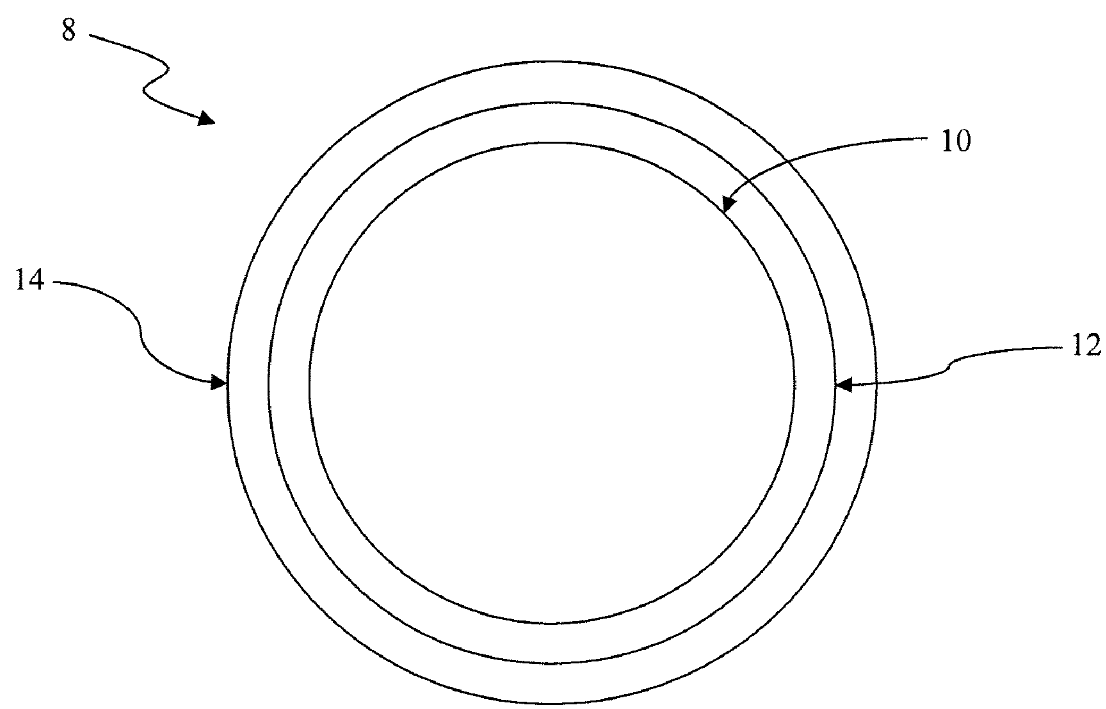
FIG. 2 is a cross-sectional view of a multi-component golf ball, wherein at least one layer is formed from a composition of the invention.
Figure 3:
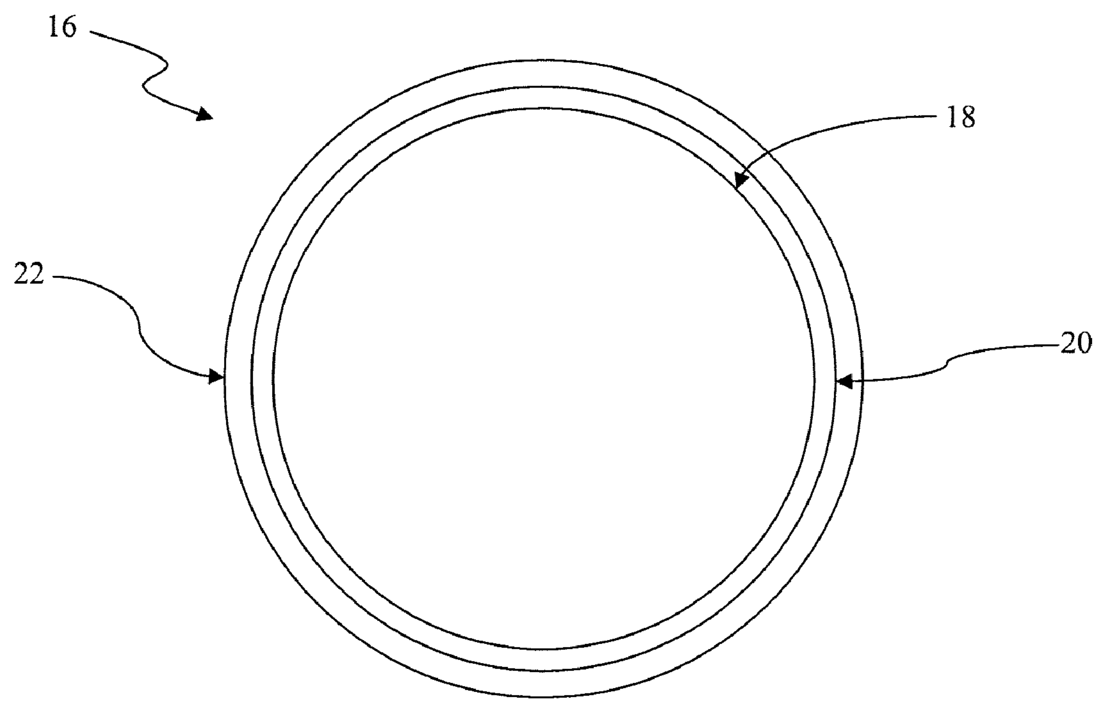
FIG. 3 is a cross-sectional view of a multi-component golf ball having a large core, wherein at least one layer is formed from a composition of the invention.

Referring to FIG. 2, a golf ball 8 of the present invention can include a center 10, a cover 14, and at least one intermediate layer 12 disposed between the cover and the center. Each of the cover and center layers in FIG. 1 or 2 may include more than one layer, i.e., the golf ball can be a conventional three-piece wound ball, a two-piece ball, a ball having a multi-layer core and an intermediate layer or layers, etc. Also, FIG. 3 shows a golf ball 16 of the present invention including a large core 18, a cover 22, and an inner cover layer 20. In one embodiment, the core 18 includes a center and an outer core layer.

Figure 4:
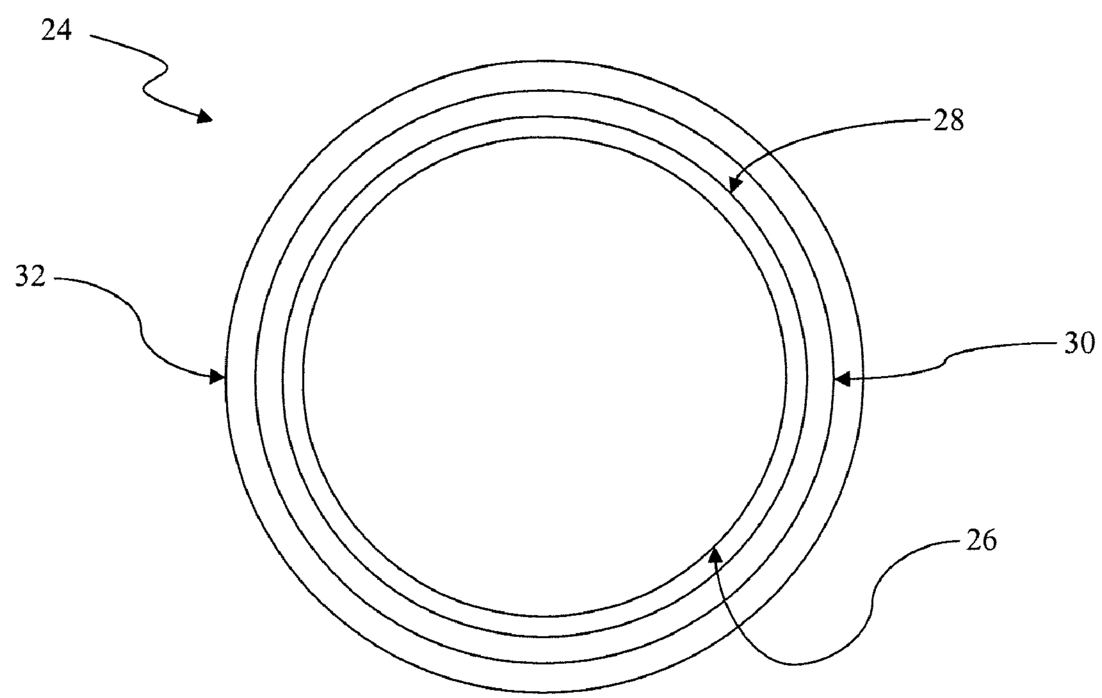
FIG. 4 is a cross-sectional view of a multi-component golf ball including a dual core and a dual cover, wherein at least one layer is formed from a composition of the invention.

In another embodiment, as shown in FIG. 4, a golf ball 24 of the present invention can include a large core having a center 26 and an intermediate layer 28 disposed underneath a dual cover having an inner cover layer 30 and an outer cover layer 32. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

The core may be formed from the compositions of the invention. For example, a core formed from the composition of the invention may be covered with a castable thermoset or injection moldable thermoplastic material or any of the other cover materials discussed below. The core may have a diameter of about 1.5 inches to about 1.62 inches and the cover layer thickness may range from about 0.03 inches to about 0.06 inches. The core compression preferably ranges from about 30 to about 120 atti and the overall ball compression is about 50 to about 110.

When not formed from the compositions of the invention, any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity (measured according to ASTM D1646-99) greater than about 20, preferably greater than about 30, and more preferably greater than about 40, may be used in one or more core layers of the golf balls prepared according to the present invention. In addition, the compositions of the invention may be incorporated the core.

A free-radical source, often alternatively referred to as a free-radical initiator, may optionally be used in the core, or one or more layers of the golf balls according to the invention, particularly when a polymer component includes a thermoset material. The free radical source for is preferably a peroxide, more preferably an organic peroxide. The peroxide is typically present in an amount greater than about 0.1 parts per hundred of the total polymer component, preferably about 0.1 to 15 parts per hundred of the polymer component, and more preferably about 0.2 to 5 parts per hundred of the total polymer component. It should be understood by those of ordinary skill in the art that the presence of certain components may require a larger amount of free-radical source than the amounts described herein. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials.

In one embodiment, the intermediate layer is formed, at least in part, from the composition of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a composition of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches. The core compression is about 30 to about 110 atti, preferably about 50 to about 100 atti, and the overall ball compression preferably ranges from about 50 to about 100 atti.

In another embodiment, the intermediate layer is covered by an inner cover layer, either of which may independently be formed from the compositions of the invention. For example, a ball of the invention may include a center having a diameter of about 0.5 inches to about 1.30 inches and a compression of about 30 to about 110 atti, preferably about 50 to about 100 atti. The center may be formed from a composition of the invention or any of the other core materials previously discussed. The core may be covered by an outer core layer to form a core, which also may be formed form the compositions of the invention, any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.06 inches formed from a composition of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the compositions of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly(ether-amide), such as PEBAX, sold by Atofina Chemicals, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In one embodiment, the intermediate layer may be a moisture barrier layer as disclosed in U.S. Pat. No. 6,632,147. Thus, a golf ball of the invention may include an intermediate layer that has a moisture vapor transmission rate lower than that of the cover and, additionally, a primary ingredient of the intermediate layer is made from a material including polybutadiene, natural rubber, butyl-based rubber, acrylics, trans-polyisoprene, neoprene, chlorinated polyethylene, balata, multi-layer thermoplastic films, blends of ionomers, polyvinyl alcohol copolymer and polyamides, and dispersions of acid salts of polyetheramines. In another embodiment, golf balls of the invention include an intermediate layer or inner cover layer formed from the compositions of the invention and an additional moisture barrier layer.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly (propylene), polyethylene, polyamide, poly(oxymethylene), polyketone, poly(ethylene terephthalate), poly(p-phenylene terephthalamide), poly(acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from a composition of the invention. For example, the present invention contemplates a golf ball having a large core of polybutadiene and a thin cover formed from the composition of the invention.

When the compositions of the invention are incorporated into a core or intermediate/inner cover layer, however, the cover may be formed from one or more homopolymeric or copolymeric materials as discussed in the section above pertaining to the intermediate layer. The cover may also be at least partially formed from a polybutadiene reaction product, as discussed above with respect to the core. Golf balls according to the invention may also be formed having a cover of polyurethane, polyurea, and polybutadiene materials discussed in U.S. Pat. No. 6,835,794.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, such as the compositions of the invention, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like. And, when a golf ball includes a cover layer formed from a composition of the invention, the HNP and flow modifier may be extruded with polymer mixing equipment, such as a single or twin-screw extruder, and then injection molded onto an inner ball.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

In one embodiment, a golf ball of the invention includes a large core, e.g., about 1.55 inches to about 1.60 inches, and a thin cover, e.g., about 0.02 inches to abut 0.05 inches, that has a 392-count icosahedron dual dimple design. In another embodiment, the golf ball includes a slightly smaller core, e.g., about 1.50 inches to about 1.57 inches, and a slightly thicker cover, e.g., about 0.04 inches to abut 0.07 inches, that has a 392-count icosahedron dimple design with 5 different types of dimples.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Any of the golf ball layers may be surface treated by conventional methods including blasting, mechanical abrasion, corona discharge, plasma treatment, and the like, and combinations thereof. In fact, because low surface energy, or surface tension, is a key feature of polysiloxanes, layers formed from the compositions of the invention may be surface treated according to U.S. Patent Publication No. 2003/0199337, the disclosure of which is incorporated in its entirety by reference herein.

Golf Ball Properties

The properties such as core diameter, intermediate layer and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches. In one embodiment, the core diameter is about 1.59 inches or greater. In another embodiment, the diameter of the core is about 1.64 inches or less.

When the core includes an inner core layer and an outer core layer, the inner core layer is preferably about 0.5 inches or greater and the outer core layer preferably has a thickness of about 0.1 inches or greater. For example, when part of a multi-layer ball according to invention, the center may have a diameter ranging from about 0.5 inches to about 1.30 inches and the outer core layer may have a diameter ranging from about 0.12 inches to about 0.5 inches. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. For example, when part of a three-piece ball or multi-layer ball according to invention, the intermediate layer and/or inner cover layer may have a thickness ranging from about 0.015 inches to about 0.06 inches.

In another embodiment, the intermediate layer thickness is about 0.05 inches or less, more preferably about 0.01 inches to about 0.045 inches.

Hardness

Solid spheres formed of the compositions of the invention preferably have a hardness of about 30 to about 60 Shore D, more preferably about 35 to about 55 Shore D, and even more preferably about 40 to about 50 Shore D. For example, in one embodiment, a solid sphere formed of the composition of the invention has a hardness ranging from about 42 to about 50 Shore D.

As such, golf ball layers formed of the compositions also preferably have hardnesses in this range. For example, a golf ball layer formed of the composition of the invention may have a hardness less than about 60 Shore D. In one embodiment, the hardness is about 50 Shore D or less. In another embodiment, the hardness ranges from about 35 Shore D to about 50 Shore D, preferably from about 40 Shore D to about 50 Shore D. Because the compositions of the invention may be used in any layer of a golf ball, the golf ball construction, physical properties, and resulting performance may vary greatly depending on the layer(s) of the ball that include the compositions of the invention.

The cores included in golf balls of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D. For example, when a core is formed from the composition of the invention, the core may have a hardness of about 40 Shore to about 50 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. For example, when an intermediate layer is formed from the compositions of the invention, the hardness of the intermediate layer may be about 50 Shore D or less, preferably ranging from about 35 Shore D to about 50 Shore D. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater. For example, a golf ball of the invention may include an inner cover formed from a rosin-modified polymeric composition of the invention having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression values are dependent on the diameter of the component being measured. The Atti compression of the core, or portion of the core, of golf balls prepared according to the invention may range from about 30 to about 110 atti, preferably about 50 to about 100 atti. In one embodiment, the core compression is less than about 80, preferably less than about 75. As used herein, the terms “Atti compression” or “compression” are defined as the deflection of an object or material relative to the deflection of a calibrated spring, as measured with an Atti Compression Gauge, which is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 50 to 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Solid spheres (1.55 inches) formed of the compositions of the invention may have a COR of at least about 0.820, preferably at least about 0.830. For example, the COR of solid spheres formed from the compositions of the invention ranges from about 0.840 to about 0.860. In one embodiment, a solid sphere formed from the composition of the invention has a COR of about 0.845 to about 0.855. In another embodiment, the COR of the solid sphere ranges from about 0.851 to about 0.856.

Alternatively, the maximum COR of the ball is one that does not cause the golf ball to exceed initial velocity requirements established by regulating entities such as the USGA. As used herein, the term “coefficient of restitution” (CoR) is calculated by dividing the rebound velocity of the golf ball by the incoming velocity when a golf ball is shot out of an air cannon. The COR testing is conducted over a range of incoming velocities and determined at an inbound velocity of 125 ft/s. Another measure of this resilience is the “loss tangent,” or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

Spin Rate

A spin rate of a golf ball refers to the speed it spins on an axis while in flight, measured in revolutions per minute (“rpm”). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist NXT Tour® golf ball that gives a ball speed of about 159 to about 161 miles/hour, a launch angle of about 9.0 degrees to about 10.0 degrees, and a spin rate of about 2900 rpm to about 3100 rpm. Thus, in one embodiment, the spin rate of a golf ball of the invention hit with a golf club driver under the same test conditions is between about 1200 rpm to about 4200 rpm. In a preferred embodiment, the spin rate of a golf ball hit with a golf club driver is between about 2000 rpm to about 4000 rpm, more preferably between about 2500 and 3900 rpm.

For an 8-iron ball spin test, a spin rate of a golf ball struck by a standard 8-iron club was obtained by using test conditions for a Titleist NXT Tour® golf ball that gives a ball speed of about 114 to about 116 miles/hour, a launch angle of about 18.5 to about 19.5 degrees and a spin rate of about 8350 rpm to about 8550 rpm. Thus, in one embodiment, the spin rate of a golf ball with an average, cleanly struck 8-iron shot is between 5500 rpm and 10,000 rpm. In preferred embodiment, the spin rate of a golf ball of the invention with an average, cleanly struck 8-iron shot under the same test conditions is between 7500 rpm and 9500 rpm, more preferably between about 7700 rpm and 9300 rpm.

For a full wedge ball spin test, a spin rate of a golf ball struck by a standard full wedge was obtained by using test conditions for a Titleist NXT Tour® golf ball that gives a ball speed of about 93 to about 95 miles/hour, a launch angle of about 24 to about 25 degrees and a spin rate of about 9650 rpm to about 9850 rpm. Thus, in one embodiment, the spin rate of a golf ball with an average, cleanly struck full wedge shot is between 8000 rpm and 12,000 rpm. In preferred embodiment, the spin rate of a golf ball of the invention with an average, cleanly struck full wedge shot under the same test conditions is between 8500 rpm and 11,500 rpm, more preferably between about 9000 rpm and 11,000 rpm.

For a half wedge ball spin test, a spin rate of a golf ball struck by a standard half wedge was obtained by using test conditions for a Titleist NXT Tour® golf ball that gives a ball speed of about 52 to about 54 miles/hour, a launch angle of about 32 to about 34 degrees and a spin rate of about 5500 rpm to about 7500 rpm. Thus, in one embodiment, the spin rate of a golf ball with an average, cleanly struck half wedge shot is between 5000 rpm and 10,000 rpm. In preferred embodiment, the spin rate of a golf ball of the invention with an average, cleanly struck half wedge shot under the same test conditions is between 6200 rpm and 8,500 rpm, more preferably between about 6500 rpm and 8000 rpm.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 15 grams per 100 $in^2$ per day or less at 38° C. and 90 percent relative humidity. In another embodiment, the golf balls of the invention have a weight gain of about 12.5 grams per 100 $in^2$ per day or less. In still another embodiment, the weight gain of the golf balls of the invention is about 7 grams per 100 $in^2$ per day or less. In yet another embodiment, the weight gain is about 5 grams per 100 $in^2$ per day or less. The golf balls of the invention preferably have a weight gain of about 3 grams per 100 $in^2$ per day or less.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein at least one of the core and cover is formed from a composition comprising:

a polymer backbone comprising urethane linkages, urea linkages, epoxy linkages, or a combination thereof;

a polysiloxane; and a coupling agent comprising:

an alkoxysilane comprising a terminal end comprising an isocyanate-reactive group; and an isocyanate-containing component, wherein the polymer backbone and polysiloxane are linked via the coupling agent.

2. The golf ball of claim 1, wherein the isocyanate-containing component comprises an isocyanurate.

3. The golf ball of claim 1, wherein the cover comprises the composition.

4. The golf ball of claim 1, wherein the polymer backbone comprises a reaction product of isocyanate and an amine-terminated component.

5. The golf ball of claim 1, wherein the isocyanate-reactive group comprises an amino group, a hydroxy group, or a combination thereof.

6. The golf ball of claim 1, wherein the polysiloxane comprises oligomers of tetraethylorthosilicate.

7. A golf ball comprising:

a core;

an intermediate layer; and a cover, wherein at least one of the intermediate layer and cover are formed from a composition comprising:

a polymer backbone comprising polyurethane, polyurea, an oxirane functional resin, or a combination thereof;

a polysiloxane; and a coupling agent comprising:

an isocyanate-containing component having a plurality of terminal ends comprising isocyanate groups;

an alkoxysilane comprising a functional group capable of reacting with the isocyanate groups, wherein the polymer backbone is linked to at least one of the plurality of terminal ends comprising isocyanate groups in the coupling agent, and wherein the polysiloxane is linked to the alkoxysilane in the coupling agent.

8. The golf ball of claim 7, wherein the intermediate layer is formed from the composition.

9. The golf ball of claim 7, wherein the cover is formed from the composition.

10. The golf ball of claim 7, wherein the coupling agent comprises amino-functional alkoxysilane.

11. The golf ball of claim 7, wherein the isocyanate-containing component comprises an isocyanurate.

12. The golf ball of claim 7, wherein the polymer backbone comprises the reaction product of an isocyanurate and an amine-terminated component.

13. The golf ball of claim 11, wherein the functional group on the alkoxysilane comprises an amino group or a hydroxy group.

14. A golf ball comprising a core and a cover, wherein the cover comprises a composition comprising:

a polymer backbone comprising the reaction product of an isocyanate and an amine-terminated component;

a polysiloxane; and a coupling agent comprising a plurality of terminal ends comprising isocyanate groups and at least one alkoxysilane terminal group, wherein the isocyanate polymer backbone is linked to at least one of the plurality of terminal ends comprising isocyanate groups in the coupling agent, and wherein the polysiloxane is linked to the alkoxysilane in the coupling agent.

15. The golf ball of claim 14, further comprising an intermediate layer disposed between the core and the cover.

16. The golf ball of claim 15, wherein the intermediate layer comprises an ionomer resin.

17. The golf ball of claim 14, wherein the polysiloxane comprises oligomers of tetraethylorthosilicate.

18. The golf ball of claim 14, wherein the polymer backbone consists essentially of urea linkages.

19. The golf ball of claim 18, wherein the coupling agent comprises the reaction product of isocyanurate and an amine-terminated alkoxysilane component.

20. The golf ball of claim 15, wherein the intermediate layer comprises a non-ionomeric material.

* * * * *